US008386555B2

(12) United States Patent
Brunswig et al.

(10) Patent No.: US 8,386,555 B2
(45) Date of Patent: Feb. 26, 2013

(54) SYSTEMS AND METHODS FOR ADAPTING PROCEDURE CALLS TO SERVICE PROVIDERS

(75) Inventors: Frank Brunswig, Heidelberg (DE); Martin Hartig, Speyer (DE); Stefan Rau, Dielhelm (DE)

(73) Assignee: SAP AG, Walldorf (DE)

( * ) Notice: Subject to any disclaimer, the term of this patent is extended or adjusted under 35 U.S.C. 154(b) by 902 days.

(21) Appl. No.: 11/266,390

(22) Filed: Nov. 4, 2005

(65) Prior Publication Data

US 2007/0124740 A1 May 31, 2007

(51) Int. Cl.
*G06F 15/16* (2006.01)
*G06F 3/00* (2006.01)
*G06F 9/44* (2006.01)
*G06F 9/46* (2006.01)
*G06F 13/00* (2006.01)

(52) U.S. Cl. ........................ 709/201; 719/328
(58) Field of Classification Search .................. 709/201; 719/328
See application file for complete search history.

(56) References Cited

U.S. PATENT DOCUMENTS

| 6,035,301 | A   | * | 3/2000  | Siegel et al. ............... 707/102 |
| 6,233,585 | B1  | * | 5/2001  | Gupta et al. ............. 707/103 R |
| 6,263,376 | B1  | * | 7/2001  | Hatch et al. ................. 719/310 |
| 6,874,149 | B1  | * | 3/2005  | Bermudez et al. ........... 719/328 |
| 2002/0032775 | A1 | * | 3/2002 | Venkataramaiah et al. .. 709/225 |
| 2002/0049749 | A1 | * | 4/2002 | Helgeson et al. ............. 707/3 |
| 2002/0112056 | A1 | * | 8/2002 | Baldwin et al. ............. 709/225 |
| 2002/0165724 | A1 | * | 11/2002 | Blankesteijn ............... 705/1 |
| 2003/0110312 | A1 | * | 6/2003 | Gunduc et al. ............. 709/328 |
| 2004/0128644 | A1 | * | 7/2004 | Hurst et al. ............... 717/100 |
| 2004/0187140 | A1 | * | 9/2004 | Aigner et al. ............. 719/328 |
| 2004/0254945 | A1 | * | 12/2004 | Schmidt et al. ............ 707/100 |
| 2006/0075383 | A1 | * | 4/2006 | Moorthy et al. ............ 717/106 |

* cited by examiner

*Primary Examiner* — George C Neurauter
*Assistant Examiner* — John Isom
(74) *Attorney, Agent, or Firm* — Mintz Levin Cohn Ferris Glovsky and Popeo, P.C.

(57) ABSTRACT

Systems and methods are provided for adapting a procedure call from a service manager to a service provider in a computer framework. An inbound procedure call is received, requesting an inbound procedure to operate on an object. Then, the inbound procedure is transformed to an outbound procedure based on a stored mapping of input procedures to output procedures. The outbound procedure is called from the service provider to operate on the object.

13 Claims, 4 Drawing Sheets

SYSTEMS AND METHODS FOR ADAPTING PROCEDURE CALLS TO SERVICE PROVIDERS

BACKGROUND

I. Technical Field

The present invention relates generally to data processing and, more particularly, to adapting procedure calls to service providers at a server system of a computer framework.

II. Background Information

In a client-services architecture, a client may call a service at a server to interact with the service through the Internet or an intranet. A service is a program that makes itself available over the Internet or an intranet, or locally. Typically, services use a standardized messaging, such as XML (Extensible Markup Language) and SOAP. Moreover, there is usually some type of web mechanism, such as UDDI (or Universal Description, Discovery, and Integration) to locate the service (and its public Application Program Interface (API)). In a computer framework, which is a framework of interconnected computers or processors that includes services (referred to as an "enterprise services framework" (ESF)), a client can call a service from a service provider through an API. The service provider includes software and/or hardware on the computer framework that allows the instantiation of business objects in response to the API call. As used herein, the term "instantiate" means, in an object oriented programming (OOP) environment, an object of a particular class, and, more generally, includes deploying, customizing, running and/or executing an application. As used herein, an "object" means a software bundle of variables (e.g., data) and related methods. For example, in object-oriented programming, an object is a concrete realization (i.e., "instance") of a class that consists of data and the operations associated with that data. The phrase "business object" refers to a software bundle of variables and related methods that can be used for describing a business process or task. For example, a client can call the API of a service provider through the Internet or intranet, or locally. The API when called instantiates business objects, such as a catalog service provider for listing products from a catalog or a purchasing service provider for allowing the purchase of a product.

However, the service providers and the API are occasionally replaced with another set of service providers and API, such as newer versions of service providers with a corresponding API to carry out substantially the same underlying tasks. The replacement API may require received calls to have a different form. Thus, these replacements of the service providers and the API can result in a miscommunication between the client and the service providers. Thus, it is desirable to seamlessly call procedures from the service providers even when the procedure calls at the service providers may take different forms over time.

SUMMARY

Consistent with embodiments of the invention, systems and methods are provided for adapting procedure calls to service providers of a computer framework. Embodiments of the invention include systems and methods, as well as computer program products comprising computer-readable program code that perform methods consistent with the invention when implemented by a computer or processor.

In accordance with one embodiment, a method is provided of adapting a procedure call from a service manager to a service provider in a computer framework. The method comprises receiving an inbound procedure call and requesting an inbound procedure to operate on an object. The inbound procedure is transformed to an outbound procedure based on a stored mapping of input procedures to output procedures. The outbound procedure is called from the service provider to operate on the object.

In accordance with another embodiment, a system is provided for adapting a procedure call from a service manager to a service provider in a computer framework. The system comprises an adapter to receive an inbound procedure call, requesting an inbound procedure to operate on an object. The adapter transforms the inbound procedure to an outbound procedure based on a stored mapping of input procedures to output procedures. Furthermore, the adapter calls the outbound procedure from the service provider to operate on the object.

In accordance with yet another embodiment, a computer program product is provided for adapting a procedure call from a service manager to a service provider in a computer framework. The computer program product comprises a computer-readable storage medium having computer-readable program code stored therein. The computer-readable program code is executable by a processor and comprises an input instruction set executable to receive an inbound procedure call, requesting an inbound procedure to operate on an object. The computer-readable program code also comprises an adapter instruction set executable to transform the inbound procedure to an outbound procedure based on a stored mapping of input procedures to output procedures. The computer-readable program code further comprises an output instruction set executable to call the outbound procedure from the service provider to operate on the object.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments consistent with the present invention may be directed to various combinations and sub-combinations of the features described in the following detailed description.

BRIEF DESCRIPTION OF THE DRAWINGS

The accompanying drawings, which are incorporated in and constitute a part of this specification, illustrate embodiments of the invention and, together with the description, serve to explain the principles of the invention. In the drawings.

DESCRIPTION OF THE EMBODIMENTS

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Figure 1:
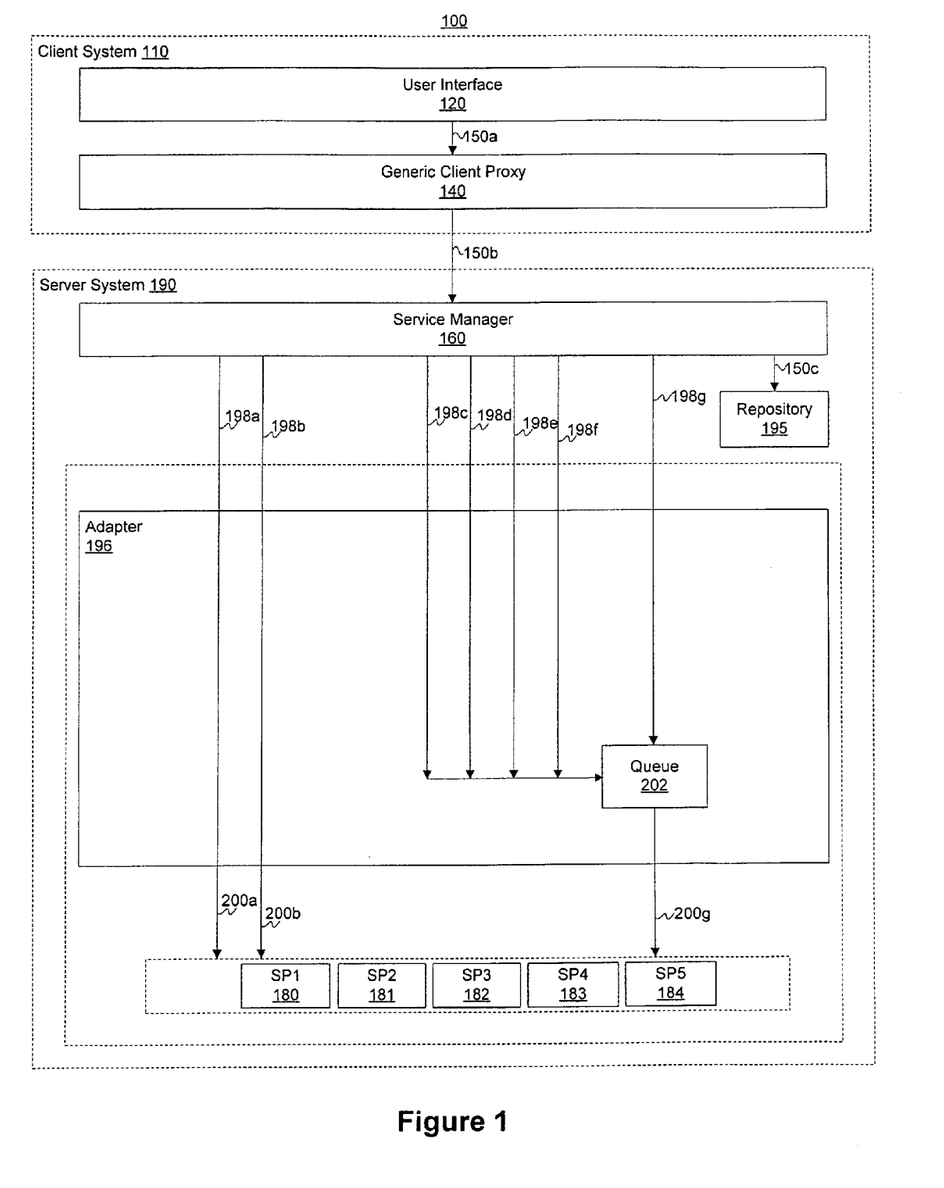
FIG. 1 is a block diagram of an exemplary environment, consistent with the present invention, of a system environment that includes a service manager and service providers, and an adapter to adapt procedure calls from the service manager to the service providers.

FIG. 1 is a block diagram of an exemplary embodiment, consistent with the present invention, of a system environment 100 that includes a client system 110 and a server system 190. Client system 110 includes a user interface (UI) 120 and a generic client proxy (GCP) 140. Client system 110 connects to server system 190 through data connection 150b. Server system 190 further includes a service manager (SM) 160 and service providers (SP1-SP5) 180-184. In some embodiments, system 100 may be implemented as part of an enterprise services framework (ESF). An ESF is a type of client-server architecture that includes one or more service providers. The service providers are accessible to other parts of the ESF, such as client systems and their corresponding users, through the Internet or an intranet, or internally. The ESF may be constructed using tools provided by SAP Netweaver™ (commercially available from SAP AG, Walldorf, Germany). Although FIG. 1 shows a single client system 110 and a single server system 190, a plurality of client systems and server systems may be used. Moreover, although FIG. 1 is described with respect to a client-server architecture and an ESF, system environment 100 can use any other architecture or framework.

Client system 110 may include one or more processors, such as computers, to interface with server system 190. User interface 120 may provide an interface to allow a user to interact with other applications, such as service providers 180-184. User interface 120 may include a browser to provide a user content from service providers 180-184. In some implementations, SAP Web Dynpro (commercially available from SAP AG, Walldorf, Germany) is used as a model-based development environment for generating user interface 120, although other development environments can also be used. User interface 120 may call the API of generic client proxy 140 through data connection 150a to, for example, interact with service provider 180.

Generic client proxy 140 may have an API implemented at client 110 that is accessible to user interface 120. When instantiated, generic client proxy 140 may provide an interface, such as a Remote Procedure Call (RPC) or SOAP interface, to service manager 160 at server system 190 through data connection 150b. Generic client proxy 140 may be implemented to control the functionality available to user interface 120 by providing a well-defined interface to service manager 160. For example, service manager 160 may include a variety of procedures, but generic client proxy 140 may be allowed access only to a subset of those procedures. Moreover, generic client proxy 140 may buffer requests and/or responses between user interface 120 and service manager 160.

Data connections 150a-150c may include, alone or in any suitable combination, a telephony-based network, a local area network (LAN), a wide area network (WAN), a dedicated intranet, wireless LAN, the Internet, an intranet, a wireless network, a bus, or any other electronic communication mechanisms. Further, any suitable combination of wired and/or wireless components and systems may provide data connections 150a-150c. Moreover, data connections 150a-150c may be embodied using bi-directional, unidirectional, or dedicated communication links. Data connections 150a-150c may also implement standard transmission protocols, such as Transmission Control Protocol/Internet Protocol (TCP/IP), Hyper Text Transfer Protocol (HTTP), SOAP, RPC, or other protocols.

Server system 190 may include one or more processors, such as computers, to interface with other computers, such as client system 190. Generic client proxy 140 calls the API of service manager 160. When the API of service manager 160 is called, an instance of the service manager 160 is created at server system 190. Service Manager 160 instance may include a message handler for handling messages to and from service manager 160; a change handler for handling changes affecting service providers 180-184 (e.g., changes that occur when user interface 120 changes, such as a button click, that affect a service provider or corresponding business objects); a controller for controlling dynamic properties of the instance (e.g., read-only, changeable, invisible, and the like); and a stack for storing changes associated with the change handler in a last in, first out (LIFO) manner. For example, when a user wishes to modify a business object, a dynamic property of the business object can be switched from "read-only" to "changeable." In another example, a dynamic property is an association between two or more business objects, such as an association between a purchase order and a published purchase order. In this example, when the purchase order acquires a status of "published," the service provider implementation sets the a dynamic property that enables the association between the purchase order and the published purchase order.

Moreover, when the API of service manager 160 is called, service manager 160 may call a procedure from the service providers 180-184, such as through an API (not shown) of service providers 180-184, to instantiate one or more of the service providers 180-184. When service provider 180 is instantiated by service manager 160, service provider 180 may also instantiate a corresponding business object. For example, a user of user interface 120 may access service provider 180 to interact with a product catalog. The data and methods associated with providing the product catalog to user interface 120 correspond to a business object.

Figure 2:
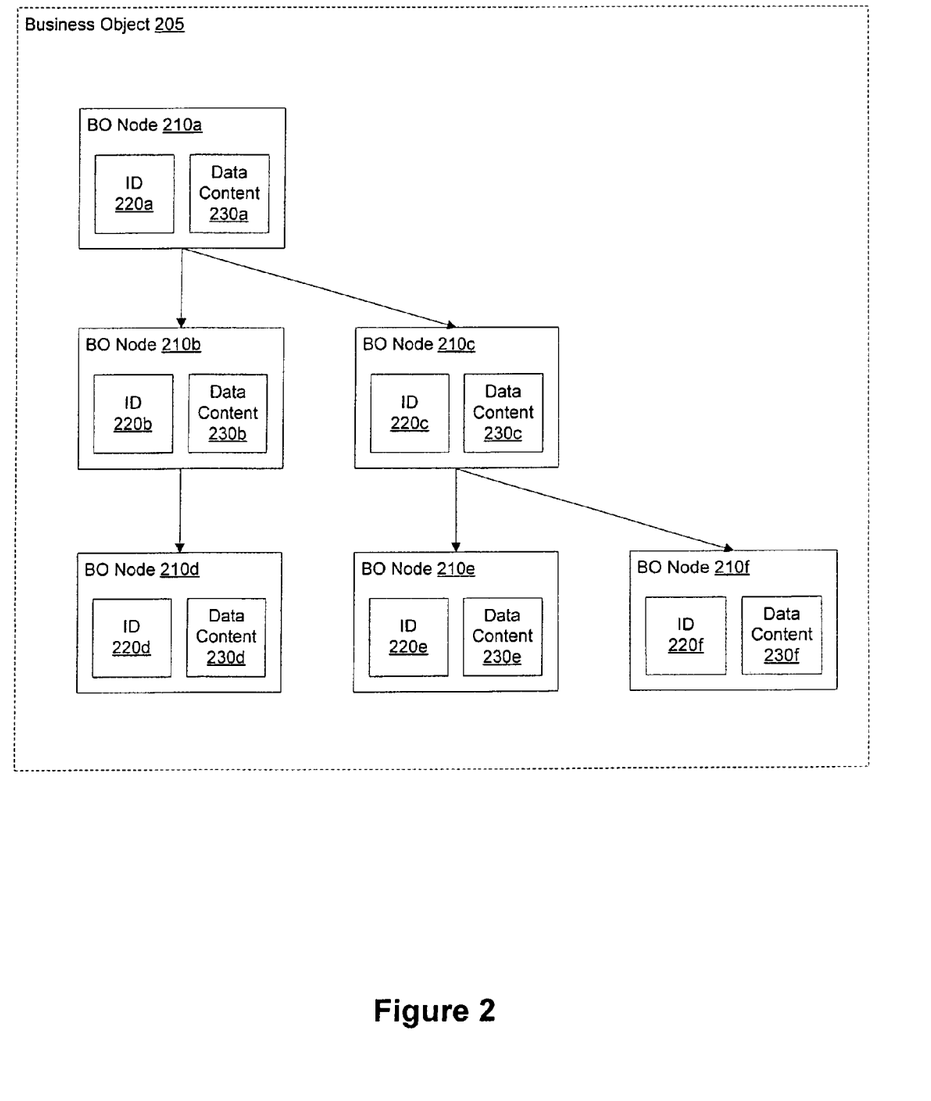
FIG. 2 is a block diagram of an exemplary embodiment, consistent with the present invention, of a data structure of a business object having multiple business object nodes.

FIG. 2 is a block diagram illustrating an exemplary embodiment of a data structure of a business object 205 comprising business object (BO) nodes 210a-210f that may be registered in a repository 195 of server system 190, shown in FIG. 1, by the service providers 180-184, such as service provider 180. The repository 195 may be implemented with a computer-readable storage medium that is accessible by the server system 190. The registration of the BO nodes 210a-210f in the repository 195 can provide a hierarchical list of BO nodes 210a-210f, although a simple list can be used instead. FIG. 2 is only illustrative since any suitable approach to registering BO nodes 210a-210f may be used.

Each of BO nodes 210a-210f includes an identifier (ID) 220a-220f and data content 230a-230f. The ID 220a-220f of BO node 210a-210f refers to an identifying technical key of BO node 210a-210f that uniquely identifies individual BO nodes 210a-210f within the repository 195. The technical key can be used to access and read data content 230a-230f of that particular BO node 210a-210f. For example, ID 220a-220f of BO node 210a-210f may comprise a directory structure and filename associated with BO node 210a-210f.

The service manager 160 calls various procedures from the service providers 180-184 to manipulate BO nodes 210a-210f. These procedures can include instructions to create, access, operate on, and search for BO nodes 210*a*-210*f* corresponding to service providers 180-184. For example, a set of modify procedures can modify BO nodes 210*a*-210*f,* such as the data content 230*a*-230*f* of BO nodes 210*a*-210*f*. These modify procedures can further include a "Create" procedure to create a new BO node, an "Update" procedure to update data content in one or more BO nodes, an "Action" procedure to change a state of a BO node, and a "Delete" procedure deletes one or more BO nodes. One or more recall procedures, such as a "Retrieve" procedure that searches for a BO node based on its technical key, or a "Query" procedure using a wildcard search, can be used to search and/or retrieve data content 230*a*-230*f* from BO nodes 210*a*-210*f*. One example of a retrieve procedure is used to retrieve a saved historical image of one or more of BO nodes 210*a*-210*f,* which is a saved version of the BO nodes in the state that the BO nodes existed at a previous time. Still further procedures may be provided to perform auxiliary tasks.

When calling modify or retrieve procedures from service provider 180 and its corresponding business object, the business object may be required to be placed in a "clean" state. The clean state may be obtained by performing a flush procedure, which executes any previously pending actions (e.g., a write, a create, an update, a delete, and so forth) at the service provider and the corresponding business object. Once the flush procedure is completed, generic client proxy 140 can write or read to the service provider 180 and the corresponding business object.

Returning to FIG. 1, an adapter 196 is provided between service manager 160 and service providers 180-184 and their corresponding business objects. The adapter 196 implements or includes an API that can be used to intercept inbound procedure calls 198*a*-198*g* from service manager 160, and adapt the inbound procedure calls 198*a*-198*f* to outbound procedure calls 200*a*-200*b*, 200*g* to the service providers 180-184, so that the call is compatible with the service provider 180-184. Data connections, which are not visible in FIG. 1, are provided between service manager 160 and adapter 196, as well as between adapter 196 and service providers 180-184. These data connections may include any of the exemplary data connections described above in reference to data connections 150*a*-150*c*.

Figure 3:
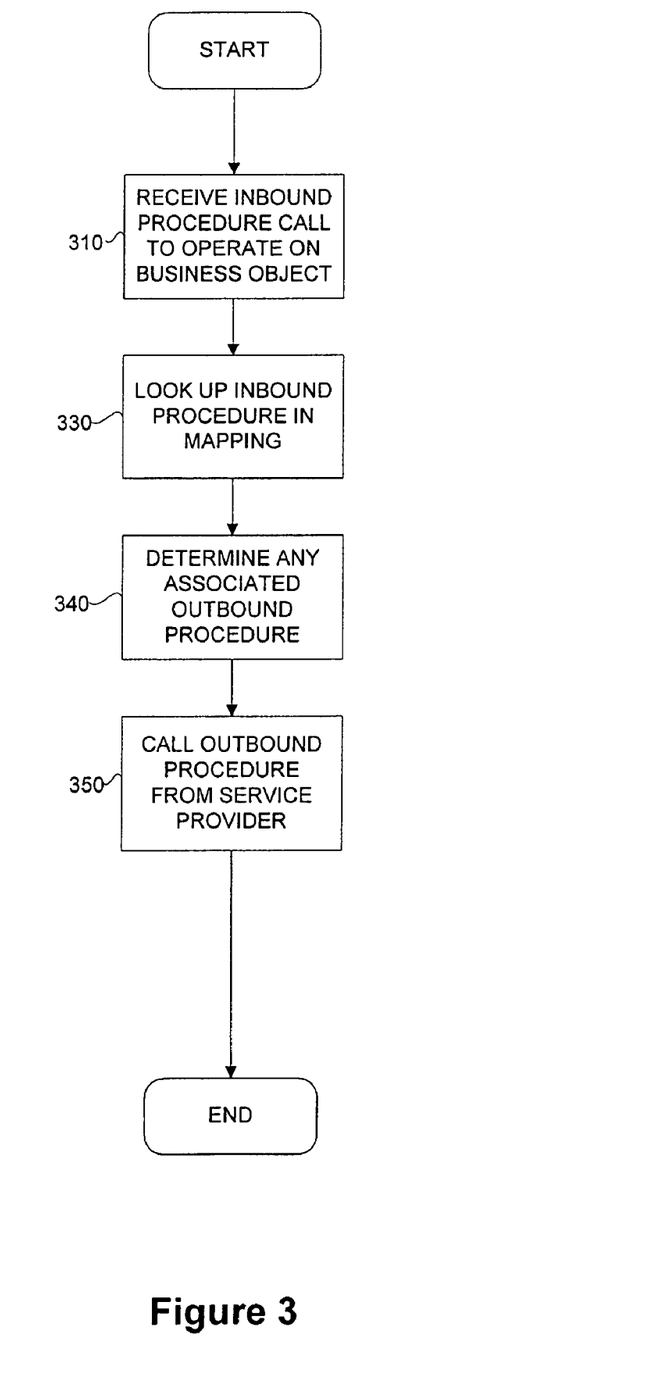
FIG. 3 is a flowchart of an exemplary embodiment, consistent with the present invention, of a method of adapting an inbound procedure call from a service manager to an outbound procedure call for service providers.

FIG. 3 is a flowchart of an exemplary embodiment, consistent with the present invention, of a method used by adapter 196 to adapt procedure calls from the service manager 160 to the service providers 180-184. Service manager 160 calls an inbound procedure from the service providers 180-184, and the inbound procedure call is instead received by the adapter 196 (step 310). The adapter 196 transforms the inbound procedure to an outbound procedure based on a stored mapping of inbound procedures to outbound procedures. The mapping includes a set of associations between inbound procedures and outbound procedures. The associations between the inbound procedures and the outbound procedures may be predetermined. The adapter 196 looks up the inbound procedure in the mapping (step 330) and determines what outbound procedure is associated with the inbound procedure in the mapping (step 340). The adapter 196 then calls the outbound procedure from an appropriate one or more of service providers 180-184 (step 350), such as from an API of service providers 180-184. The business object 205 may comprise meta data that associates the business object 205 with one or more of service providers 180-184 that are responsible for that business object 205.

Depending upon the content of the inbound procedure call and the design of adapter 196, transforming the inbound procedure to an outbound procedure and then calling the outbound procedure from the service providers may consist of different modes of operation. Returning to FIG. 1, transforming the inbound procedure to an outbound procedure and calling the outbound procedure from service providers 180-184 may include sequentially queuing a plurality of inbound procedures called by inbound procedure calls 198*c*-198*f* before calling a corresponding outbound procedure in an outbound procedure call 200*g*. Inbound procedure calls 198*c*-198*f* may call procedures to, for example, modify a BO node, such as to create, update, delete, or act upon a BO node. Afterward, a trigger procedure call 198*g* is received by adapter 196. The trigger procedure call 198*g* calls a type of inbound procedure, referred to as a trigger procedure, that is associated with the inbound procedures queued in queue 202 of adapter 196 as a result of inbound procedure calls 198*c*-198*f*. When the adapter 196 receives the trigger procedure call 198*g*, the adapter 196 transforms the queued set of inbound procedures to an outbound procedure, and makes outbound procedure call 200*g* from the service providers 180-184. The adapter 196 may also clear, from queue 202, the queued set of inbound procedures resulting from inbound procedure calls 198*c*-198*f*.

Inbound procedure calls 198*c*-198*f* may call, for example, different modify procedures. In an exemplary embodiment, inbound procedure call 198*c* is a "Create" procedure call to create a BO node, inbound procedure call 198*d* is an "Update" procedure call to update a BO node, inbound procedure call 198*e* is a "Delete" procedure call to delete a BO node, and inbound procedure call 198*f* is an "Action" procedure call to act upon a BO node to change a state of the BO node. The inbound procedures called by inbound procedure calls 198*c*-198*f* may be queued in queue 202 of adapter 196. When adapter 196 receives inbound trigger procedure call 198*g*, such as an "EndOperate" procedure call defined in the stored mapping, the adapter 196 may call outbound procedure call 200*g*, such as to call an outbound "MODIFY" procedure, from service providers 180-184. For example, the "MODIFY" procedure call may include a list of sub-commands, such as "Create," "Update," "Delete," and "Action," and a table having data that correspond to these sub-commands. The single outbound procedure call 200*g* transmits these aggregated commands and data to service providers 180-184. As such, the multiple inbound procedure calls 198*c*-198*g* (e.g., "Create," "Update," "Delete," "Action", and the trigger procedure call) from service manager 160 have been adapted by adapter 196 into a single outbound procedure call 200*g* to service providers 180-184.

In another example, inbound procedure calls 198*a*, 198*b* may be made to the service provider 196 without adapting inbound procedure calls 198*a*, 198*b* to a different output procedure call. The adapter 196 may recognize a preselected inbound procedure 198*a*, 198*b* as an inbound procedure that should be called directly from the service providers 180-184 without transformation. For example, inbound procedure calls 198*a*-198*b* may call procedures to retrieve a BO node or query a BO node.

Also, if the inbound procedure is not found in the mapping, the adapter 196 may effectively pass such an unmapped inbound procedure through the adapter 196 to the service providers 180-184 without transformation. Alternatively, the adapter 196, upon receiving an inbound procedure call of an unmapped inbound procedure, may absorb the inbound procedure call, meaning that the adapter 196 does not call any outbound procedure from the service providers 180-184 in response to the inbound procedure call.

Table 1 is a table illustrating an exemplary mapping of inbound procedures to outbound procedures by the adapter 196 of FIG. 1. Multiple examples of inbound procedures and their corresponding outbound procedures are shown in the mapping. Outbound procedures are labeled as "Untransformed" in Table 1 when the inbound procedure is not transformed, but rather passed directly through the adapter 196. Outbound procedures are labeled as "Queued" in Table 1 when the adapter 196 queues the inbound procedure in a memory to eventually map a plurality of such queued inbound procedures to one or more outbound procedures. The inbound procedure call of the inbound procedure labeled as "EndRetrieve" in Table 1 is absorbed by the adapter 196 without calling a corresponding outbound procedure.

TABLE 1

| INBOUND PROCEDURE | OUTBOUND PROCEDURE |
| --- | --- |
| Init | (Untransformed) |
| Create, Update, Delete | (Queued) |
| Action | (Queued) |
| EndOperate | MODIFY |
| Retrieve | (Untransformed) |
| RetrieveByAssociation | (Untransformed) |
| Query | (Untransformed) |
| RetrieveRootNodeID | (Untransformed) |
| ConvertKeyToNodeID | (Untransformed) |
| EndRetrieve | (Absorbed) |
| Check ("complete") | CHECK |
| Check ("finalize") | FINALIZE |
| Check ("check before save") | BEFORE_SAVE |
| Save | SAVE |
| Cleanup ("commit") | AFTER_COMMIT |
| Cleanup ("rollback") | AFTER_REJECTED_SAVE |
| Cleanup ("session end") | CLEANUP |

In one embodiment, the adapter 196 of FIG. 1 is implemented with a computer program product for interfacing the client system 110 to the server system 190. The computer program product comprises a computer-readable storage medium having computer-readable program code stored therein. The computer-readable program code is executable by a processor. Examples of computer-readable program code include, for example, machine code, such as produced by a compiler, and files containing a high level code that can be executed by the computer using an interpreter.

Figure 4:
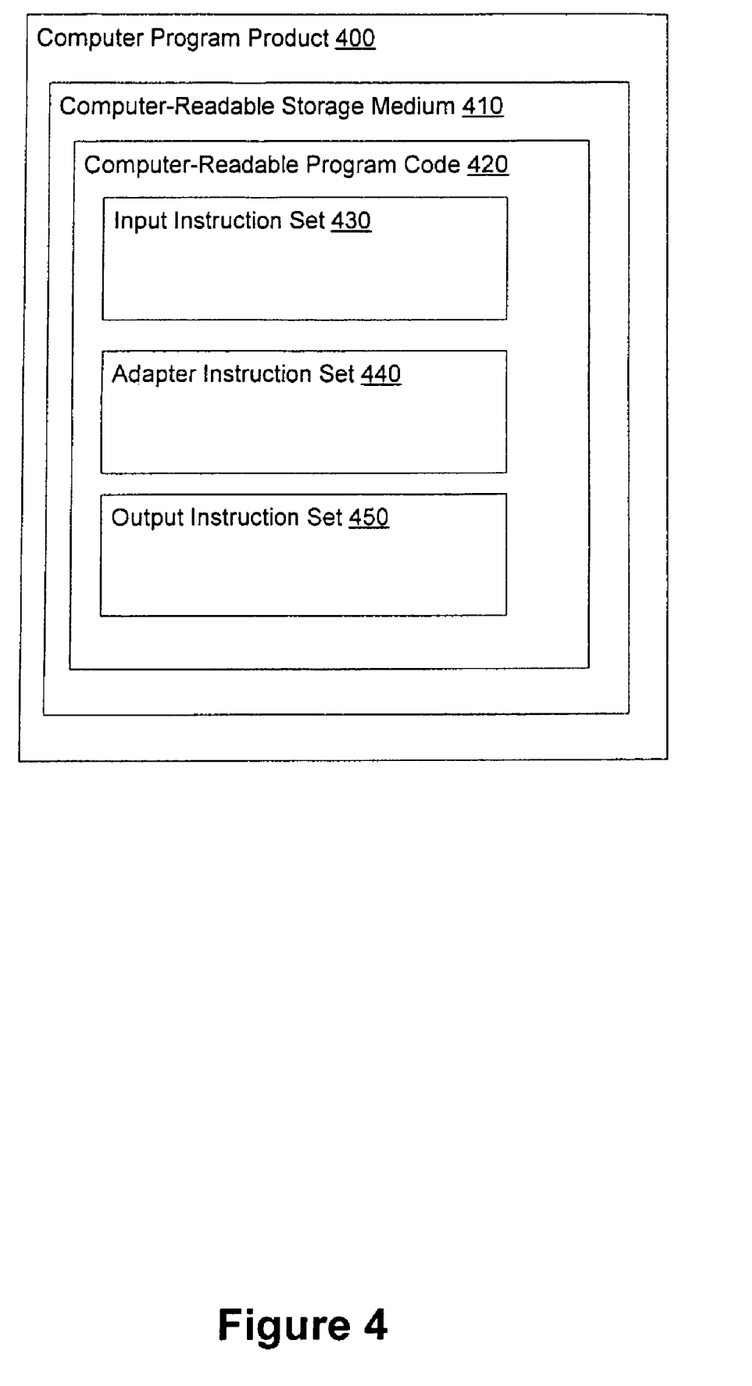
FIG. 4 is a block diagram of an exemplary embodiment, consistent with the present invention, of a computer program product including a computer-readable storage medium having computer-readable program code stored therein.

For purposes of illustration, FIG. 4 is a block diagram of an exemplary embodiment, consistent with the present invention, of a computer program product 400 including a computer-readable storage medium 410 that has the computer-readable program code 420 stored therein. The computer-readable program code 420 includes an input instruction set 430 executable to receive a call requesting an inbound procedure to operate on one or more business objects in the repository 195. An adapter instruction set 440 is executable to transform the inbound procedure to an outbound procedure based on a stored mapping of input procedures to output procedures. The adapter instruction set 440 can also implement queue 202 during execution by a processor, such as in a register memory of the processor or another random access memory (RAM) of server system 190. An output instruction set 450 is executable to call the outbound procedure from the service providers to operate on the business objects.

Thus, the methods and systems described herein provide compatibility between the service manager and the service providers at the server system of the computer framework. This compatibility can be advantageous, such as when the program structures of the service providers are updated more frequently than the program structure of the service manager, or vice versa.

The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in other ways, using equivalents and alternatives that do not depart from the scope of the following claims.

The methods, systems, and computer program products disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus to perform the required methods and techniques.

What is claimed is:

1. A method comprising:
receiving an inbound procedure call from a service manager, the inbound procedure call requesting at a service provider an inbound procedure to operate on a business object, the inbound procedure call responsive to a call from a user interface and a generic client proxy;
transforming, at an adapter, the inbound procedure, received via the service manager, to an outbound procedure such that the outbound procedure matches a processed inbound procedure transformed based on a stored mapping of inbound procedures to outbound procedures, wherein the stored mapping includes a set of predetermined associations between the inbound procedures and the outbound procedures, and according to metadata included in the business object associating the business object with at least one service provider from which the outbound procedure is available to be called, when the outbound procedures used by the service provider are not compatible with the inbound procedures, and when the outbound procedures are compatible with the inbound procedures, by-passing the transforming at the adapter such that the outbound procedure matches the untransformed inbound procedure received via the service manager; and
calling the outbound procedure from the service provider to operate on the business object when the inbound procedure is found in the stored mapping;
wherein the transforming the inbound procedure to the outbound procedure comprises
sequentially queuing at the adapter a plurality of inbound procedures operating on one or more objects that include the business object to map the queued plurality of inbound procedures operating on the one or more objects to a single replacement outbound procedure operating on the one or more objects such that the queued plurality of inbound procedures is replaced by the single replacement outbound procedure to operate on the one or more objects, receiving a trigger procedure call defined in the stored mapping, calling the replacement outbound procedure from the service provider in response to receiving the trigger procedure call, and clearing the queued inbound procedures from the adapter;

wherein a preselected inbound procedure is configured to be recognized by the adapter as an inbound procedure that is called directly from the service provider without transformation;

wherein when the inbound procedure is not found in the stored mapping, the adapter is configured to absorb the inbound procedure call by not calling the outbound procedure from the service provider in response to the inbound procedure.

2. A method according to claim 1, wherein the receiving step comprises receiving an inbound procedure call, requesting an inbound procedure to operate on a business object, and wherein the calling step comprises calling the outbound procedure from the service provider to operate on the business object.

3. A method according to claim 1, wherein calling the outbound procedure comprises calling a procedure from the service provider to modify the object.

4. A method according to claim 1, wherein transforming the inbound procedure and calling the outbound procedure comprise calling the inbound procedure from the service provider.

5. A method according to claim 1, wherein calling the outbound procedure comprises calling a retrieval procedure from the service provider to retrieve a saved historical image of a business object node.

6. A system comprising:
a processor; and
a memory, the processor and memory configured to provide:
an adapter to:
receive an inbound procedure call from a service manager, the inbound procedure call requesting at a service provider an inbound procedure to operate on a business object, the inbound procedure call responsive to a call from a user interface and a generic client proxy;
transform, at the adapter, the inbound procedure, received via the service manager, to an outbound procedure such that the outbound procedure matches a processed inbound procedure transformed based on a stored mapping of inbound procedures to outbound procedures, wherein the stored mapping includes a set of predetermined associations between the inbound procedures and the outbound procedures, and according to metadata included in the business object associating the business object with at least one service provider from which the outbound procedure is available to be called, when the outbound procedures used by the service provider are not compatible with the inbound procedures, and when the outbound procedures are compatible with the inbound procedures, to by-pass the transformation at the adapter such that the outbound procedure matches the untransformed inbound procedure received via the service manager; and call the outbound procedure from the service provider to operate on the business object when the inbound procedure is found in the stored mapping;

wherein the adapter is configured to transform the inbound procedure to the outbound procedure by
sequentially queuing a plurality of inbound procedures operating on one or more objects that include the business object to map the queued plurality of inbound procedures operating on the one or more objects to a single replacement outbound procedure operating on the one or more objects such that the queued plurality of inbound procedures is replaced by the single replacement outbound procedure to operate on the one or more objects, receiving a trigger procedure call defined in the stored mapping, calling the replacement outbound procedure from the service provider in response to receiving the trigger procedure call, and clearing the queued inbound procedures from the adapter;

wherein a preselected inbound procedure is configured to be recognized by the adapter as an inbound procedure that is called directly from the service provider without transformation;

wherein when the inbound procedure is not found in the stored mapping, the adapter is configured to absorb the inbound procedure call by not calling the outbound procedure from the service provider in response to the inbound procedure.

7. A system according to claim 6, wherein the adapter is adapted to call a procedure from the service provider to modify the object.

8. A system according to claim 6, wherein the adapter is adapted to call the inbound procedure from the service provider.

9. A system according to claim 6, wherein the adapter is adapted to call a retrieval procedure from the service provider to retrieve a saved historical image of a business object node.

10. A computer program product including a non-transitory computer-readable storage medium having computer-readable program code stored therein, and the computer-readable program code being executable by a processor and comprising:
an input instruction set executable to receive an inbound procedure call from a service manager, the inbound procedure call requesting at a service provider an inbound procedure to operate on a business object, the inbound procedure call responsive to a call from a user interface and a generic client proxy;
an adapter instruction set executable to transform, at an adapter, the inbound procedure, received via the service manager, to an outbound procedure such that the outbound procedure matches a processed inbound procedure transformed based on a stored mapping of inbound procedures to outbound procedures, wherein the stored mapping includes a set of predetermined associations between the inbound procedures and the outbound procedures, and according to metadata included in the business object associating the business object with at least one service provider from which the outbound procedure is available to be called, when the outbound procedures used by the service provider are not compatible with the inbound procedures, and when the outbound procedures are compatible with the inbound procedures, to by-pass the transformation at the adapter such that the outbound procedure matches the untransformed inbound procedure received via the service manager; and an output instruction set executable to call the outbound procedure from the service provider to operate on the business object when the inbound procedure is found in the stored mapping;

wherein the adapter instruction set executable to transform the inbound procedure to the outbound procedure includes instructions executable to sequentially queue a plurality of inbound procedures operating on one or more objects that include the business object to map the queued plurality of inbound procedures operating on the one or more objects to a single replacement outbound procedure operating on one or more objects such that the queued plurality of inbound procedures is replaced by the single replacement outbound procedure to operate on the one or more objects, receive a trigger procedure call defined in the stored mapping, call the replacement outbound procedure from the service provider in response to receiving the trigger procedure call, and clear the queued inbound procedures from the adapter;

wherein a preselected inbound procedure is configured to be recognized by the adapter as an inbound procedure that is called directly from the service provider without transformation;

wherein when the inbound procedure is not found in the stored mapping, the adapter is configured to absorb the inbound procedure call by not calling the outbound procedure from the service provider in response to the inbound procedure.

11. A computer program product according to claim 10, wherein the output instruction set is executable to call a procedure from the service provider to modify the object.

12. A computer program product according to claim 10, wherein the output instruction set is executable to call the inbound procedure from the service provider.

13. A computer program product according to claim 10, wherein the output instruction set is executable to call a retrieval procedure from the service provider to retrieve a saved historical image of a business object node.

* * * * *